(12) United States Patent
Dieckilman

(10) Patent No.: US 9,782,843 B2
(45) Date of Patent: Oct. 10, 2017

(54) BEVELING CUTTER HAVING HELICAL EDGED BLADES AND DISCHARGE GROOVES

(71) Applicant: Thomas M. Dieckilman, Carlsbad, CA (US)

(72) Inventor: Thomas M. Dieckilman, Carlsbad, CA (US)

(73) Assignee: Thomas M. Dieckilman, Carlsbad, CA (US)

( * ) Notice: Subject to any disclaimer, the term of this patent is extended or adjusted under 35 U.S.C. 154(b) by 198 days.

(21) Appl. No.: 14/311,798

(22) Filed: Jun. 23, 2014

(65) Prior Publication Data

US 2015/0078842 A1    Mar. 19, 2015

Related U.S. Application Data

(60) Provisional application No. 61/956,999, filed on Jun. 21, 2013.

(51) Int. Cl.
*B23B 5/12*    (2006.01)
*B23C 5/12*    (2006.01)
(Continued)

(52) U.S. Cl.
CPC ................ *B23C 5/12* (2013.01); *B23C 3/126* (2013.01); *B23C 5/04* (2013.01);
(Continued)

(58) Field of Classification Search
CPC ..... B23C 2210/485; B23C 3/126; B23C 5/02; B23C 2210/123; B23C 2220/16; B23C 2265/08
(Continued)

(56) References Cited

U.S. PATENT DOCUMENTS

| 2,782,490 A | 2/1957 | Graves |
| 5,101,557 A * | 4/1992 | Mueller ................ B23B 47/28 29/889.21 |

(Continued)

FOREIGN PATENT DOCUMENTS

| CH | 701414 | 1/2011 |
| CN | 102398117 | 4/2012 |

(Continued)

OTHER PUBLICATIONS

Chinese Office Action for corresponding Chinese patent application No. 2013800352042, dated Mar. 3, 2016.

(Continued)

*Primary Examiner* — Sara Addisu
(74) *Attorney, Agent, or Firm* — Steven M. Koehler; Westman, Champlin & Koehler, P.A.

(57) ABSTRACT

A beveling cutter can include a body with a shaft hole formed through the center. The cutter can also include a plurality of 10 cutter blades arranged at predetermined distances on the circumferential surface of the body, each having a radial primary blade with a radial primary relief angle (a) ranging from about 5 to about 15 degrees and a radial secondary blade with a radial secondary relief angle (b) ranging from about 16 to about 30 degrees. The cutter can also include discharge grooves formed longitudinally between the cutter blades to discharge chips produced in beveling, and a key groove formed at a portion inside the body, in which the helix angle (d) of the cutter blades ranges from about 5 to about 45 degrees. With the beveling cutter, it is possible to smoothly discharge chips produced in beveling and to prevent damage to the cutter blades.

17 Claims, 2 Drawing Sheets

(51) Int. Cl.
*B23C 3/12* (2006.01)
*B23C 5/04* (2006.01)

(52) U.S. Cl.
CPC  *B23C 2210/0485* (2013.01); *B23C 2210/123* (2013.01); *B23C 2220/16* (2013.01); *B23C 2265/08* (2013.01); *Y10T 407/1962* (2015.01)

(58) Field of Classification Search
USPC ........................................................ 407/113
See application file for complete search history.

(56) References Cited

U.S. PATENT DOCUMENTS

| | | | |
|---|---|---|---|
| 5,176,476 A | 1/1993 | Duffy et al. | |
| 6,450,471 B1 | 9/2002 | Wear | |
| 7,862,263 B2 * | 1/2011 | van Iperen | B23C 5/10 |
| | | | 407/54 |
| 2005/0025584 A1 | 2/2005 | Koelker | |
| 2005/0089383 A1 | 4/2005 | Nordlin | |
| 2012/0183363 A1 * | 7/2012 | Davis | B23C 5/10 |
| | | | 407/54 |

FOREIGN PATENT DOCUMENTS

| | | |
|---|---|---|
| CN | 202606958 U | 12/2012 |
| CN | 102941373 A | 2/2013 |
| CN | 202779974 U | 3/2013 |
| DE | 202006006114 | 6/2006 |
| JP | H05337716 A | 12/1993 |
| JP | H0871831 | 3/1996 |
| JP | H0871831 A | 3/1996 |
| JP | H09192915 A | 7/1997 |
| JP | 2007075944 A | 3/2007 |
| KR | 20100093020 | 8/2010 |
| WO | 2011056507 | 5/2011 |

OTHER PUBLICATIONS

International Preliminary Report on Patentability for International Application No. PCT/NL2013/000037, dated Jan. 5, 2015.
Response to written opinion dated Nov. 14, 2013 filed on Jun. 16, 2014 in International Application No. PCT/NL2013/000037.
Response to written opinion dated Nov. 14, 2013 filed on Dec. 1, 2014 in International Application No. PCT/NL2013/000037.
Chinese Office Action corresponding Appln. No. 201380035204.2, dated Jan. 19, 2017, 12 pages.
International Search Report from corresponding foreign application serial No. PCT/NL2013/00037 dated Nov. 14, 2013.
Office Action from Japanese Patent Application No. 2015-520084, dated May 24, 2017, 4 pages.

* cited by examiner

BEVELING CUTTER HAVING HELICAL EDGED BLADES AND DISCHARGE GROOVES

CROSS-REFERENCE TO RELATED APPLICATION

The present application is based on and claims the benefit of U.S. provisional patent application Ser. No. 61/956,999 filed Jun. 21, 2013, the content of which is hereby incorporated by reference in its entirety.

TECHNICAL FIELD

The present invention relates to a beveling cutter capable of machining a beveled edge on metal using helical shaped cutting blades and discharge grooves which can machine an edge on a metal work piece with more uniformity while reducing or eliminating vibration and chattering often experienced when beveling metal with traditional tools.

BACKGROUND

The discussion below is merely provided for general background information and is not intended to be used as an aid in determining the scope of the claimed subject matter.

The beveling machines of the related art include a drive unit and a power transmission unit in a min body having the function of a handle with a spindle mounted on a head unit, which spindle is rotated by power from the power transmission unit. The beveling cutter is mounted on the free end of the spindle. A base or guide plate is installed between the spindle and the power transmission unit which serves as a depth guide on one side of the bevel. A cam bearing is attached over the top of the beveling cutter which serves as a depth guide on the opposite side of the bevel.

In beveling machines with such a configuration, the edge of a work piece is aligned with the cutter, the driving unit in the body is driven by an electric or a pneumatic motor, and the driving force rotates the spindle through the power transmission unit. With the rotation of the spindle, the router bit at the free end is rotated and machines a predetermined shape on the work piece.

When the edge of a work piece is machined, however, metal beveling machines often have a problem when the work piece and the cutter come in contact with each other, the spindle chatters, leaving an imperfect edge and the internal parts of the motor transmission can be damaged from shock due to the chattering.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention herein in disclosed is a beveling cutter having a body with a shaft hole formed through the center, a plurality of about ten (10) cutter blades extending at regular intervals with a helix angle of about 1 to about 40 degrees around the shaft hole on the outer circumferential surface of the body while having both sides that are beveling sides, discharge grooves formed longitudinally between the cutter blades to discharge chips produced in beveling, and cutting grooves recessed on the surfaces of the cutter blades. As such, it is possible to discharge chips even if long plane chips are produced and to machine an edge uniformly when beveling.

In another aspect of the present invention, a beveling cutter may include: a body with a shaft hole formed through the center; a plurality of cutter blades arranged at predetermined distances on the circumferential surface of the body, each having a radial primary blade with a radial primary relief angle ranging from about 5 to about 15 degrees and a radial secondary blade with a radial secondary relief angle ranging from about 16 to about 30 degrees; discharge grooves formed longitudinally between the cutter blades to discharge chips produced in beveling; and a key groove formed at a portion inside the body.

Rake angle portions may be formed at an angle ranging from about 10 to about 20 degrees on a plurality of the cutter blades of the present invention.

Helical shape cutter blades of the present invention may have a core taper angle ranging from about 20 to about 30 degrees. Honed portions may be formed by honing a side of the radial primary blades of the present invention at an angle ranging from about 1 to about 45 degrees to prevent the cutter blades from breaking or chattering.

With a beveling cutter such as disclosed, since the radial primary relief angle and the radial secondary relief angle range from about 5 to about 15 degrees and from about 16 to about 30 degrees, respectively, there are advantages in that it is possible to reduce load generated in the beveling of a work piece and to prevent machining interference and chattering by ensuring a sufficient gap between the work piece and the radial primary blades.

Additionally, with a beveling cutter such as disclosed, since the horned portion is formed at a side of the radial primary blade, there is the advantage in that it is possible to prevent the cutter blades from breaking and chattering. Further, since the core taper angle of the beveling cutter ranges from about 20 to about 30 degrees, there is the advantage in that it is possible to increase the stiffness and lifespan of the beveling cutter.

With a beveling cutter such as disclosed, since rake angle portions are formed in the range of angle of about 10 to about 20 degrees, there is also the advantage in that it is possible to smoothly discharge chips produced in beveling of a work piece, even without specific cutting grooves, which can minimize or eliminate flame generation.

DETAILED DESCRIPTION OF THE ILLUSTRATIVE EMBODIMENTS

Figure 1:
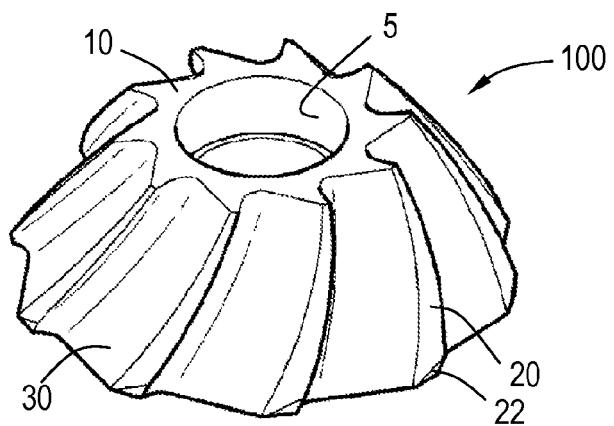
FIG. 1 is a perspective view showing a beveling cutter according to an embodiment of the present invention.

In the following and in line with the embodiments and aspects of the present invention, beveling cutters will be described in detail with reference to the accompanying drawings.

Beveling cutter 100 in the form of an embodiment of the present invention, as shown in FIGS. 1-4 and FIGS. 6A-6D includes a body 10, a plurality of cutter blades 20 arranged at predetermined distances on the circumferential surface of the body 10, discharge grooves 30 formed longitudinally between the cutter blades 20 to discharge chips produced in beveling, and a key groove 40 formed at a portion inside the body 10.

The body 10 of the beveling cutter 100, as shown in FIG. 1, has a shaft hole 5 formed through the center and ten (10) cutter blades 20 arranged at predetermined distances. The key groove 40 is formed at a portion inside the body 10. Though not shown in the figures, it is possible to simply mount the beveling cutter on an electric or a pneumatic air tool by inserting a cutter fixing key into the key groove 40 and tightening a cutter fixing bolt in a bolt hole formed at the center of a rotary shaft to firmly fix the beveling cutter.

Figure 2:
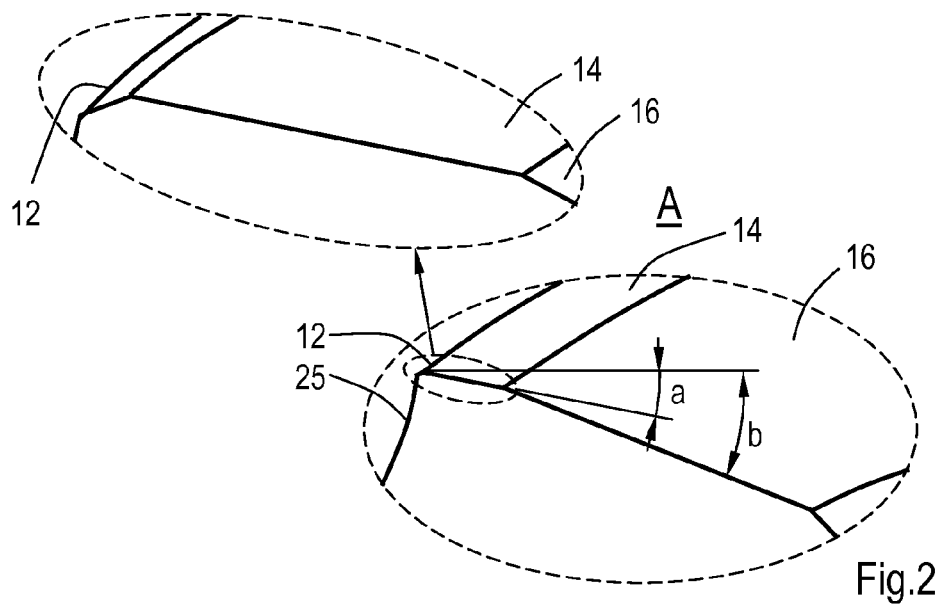
FIG. 2 is a view illustrating radial primary and secondary relief angles of a cutter blade.

The cutter blades 20 are arranged at predetermined distances on the circumferential surface of the body 10, as shown in FIG. 2, each of which has a radial primary blade 14 with a radial primary relief angle (a) ranging from about 5 to about 15 degrees and a radial secondary blade 16 with a radial secondary relief angle (b) ranging from about 16 to about 30 degrees. The width of the radial primary blade 14 is about 0.6 to about 0.7 mm and the width of the radial secondary blade 16 is about 1.9 to about 2.0 mm. The helix angle (d) of the cutter blades ranges from about 5 to about 45 degrees.

The radial primary relief angle (a) is selected to an optimal angle, about 5 to about 15 degrees, to reduce load generated in the beveling of a work piece. Honed portions 12 are formed by honing a side of the radial primary blades 14 at an angle ranging from about 1 to about 45 degrees to prevent the cutter blades from breaking or chattering. Although the honed portions 12 may be about 0.05 to about 0.2 mm wide in one embodiment, it is preferable to make them about 0.1 mm wide.

The radial secondary relief angle (b) is selected to an optimal angle, about 16 to about 30 degrees, to prevent machining interference and chattering by ensuring a sufficient gap between a work piece 60 and the radial primary blade 14 in beveling.

A round portion 22, which has a radius (r) ranging from about 0.1 to about 3.0, is formed at the end of the cutter blade 20 to prevent damage to the cutter blade and to keep a worker safe.

As shown in FIG. 2, a rake angle portion may be formed on the cutter blades 20, at an appropriate angle in the range of about 10 to about 20 degrees for smooth discharge of chips (not shown) produced when machining a work piece, with chips smoothly discharged even without specifically forming a cutting groove (not shown) on the cutter blades. In other words, the discharge of chips is induced by forming a cutting groove at a predetermined portion on cutter blades in the related art, whereas the rake angle portion 25 is formed at an appropriate angle (that is, about 10 to about 20 degrees) herein so that chips produced in machining (beveling) of work piece 60 are smoothly discharged without flying to the cutter blades or the work piece 60.

Figure 3:
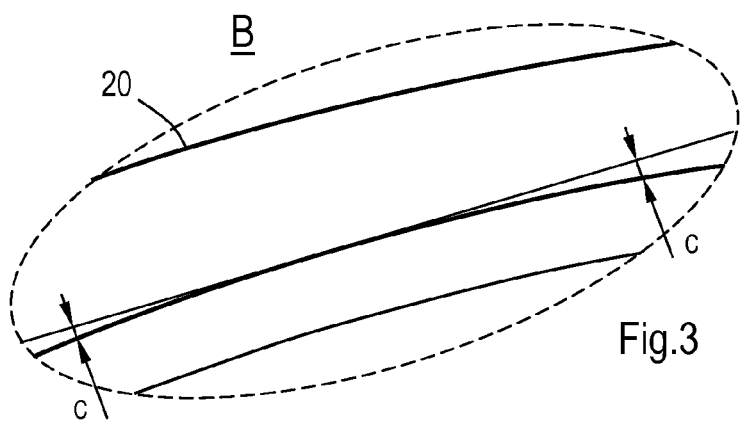
FIG. 3 is a view illustrating the core taper of a cutter blade.
Figure 4:
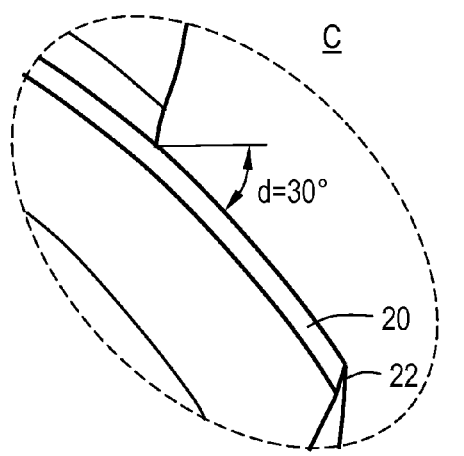
FIG. 4 is a side view illustrating a helix angle of a cutter blade.

The cutter blades 20 have a core taper angle (c) ranging from about 20 to about 30 degrees, as shown in FIG. 3 in the present invention. The core taper angle (c), an important factor for increasing stiffness and lifespan of the cutter blades 20, is preferably set within the range of angle described above (about 20 to about 30 degrees).

Although the embodiment described above is based on a beveling angle of about 30 degrees, the beveling angle may be about 37.5 degrees and about 45 degrees in other embodiments of the present invention, as shown in FIGS. 6A-6D. Other factors, including the helix angle, the radial primary relief angle (a), and the radial secondary relief angle (b) are almost similar to those in the embodiment described above and thus the detailed description is not provided below.

The description below shows how to mount the beveling cutter of the present invention with the configuration described above on a pneumatic air or an electric tool 50 and to bevel a work piece.

Figure 5:
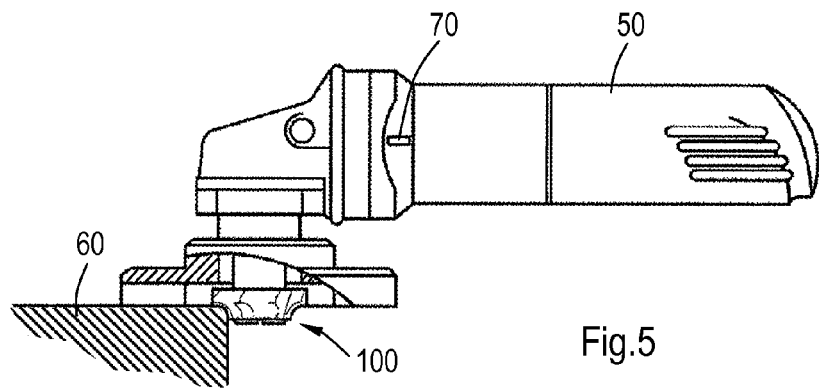
FIG. 5 is a view showing an example of the use of the beveling cutter.
Figure 6A:
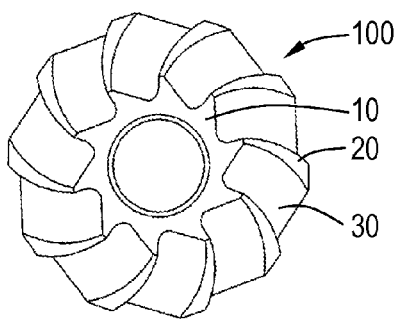
FIGS. 6A-6D are views showing other embodiments of the beveling cutter.
Figure 6B:
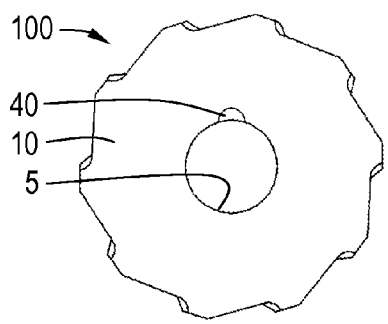
Figure 6C:
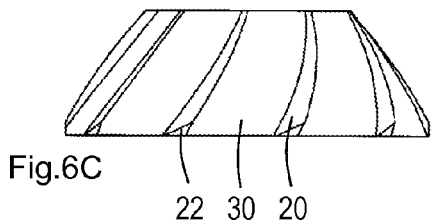
Figure 6D:

The beveling cutter 100 according to an embodiment of the present invention is mounted, as shown in FIG. 5, by fitting a rotary shaft (not shown) of a pneumatic air or an electric tool 50 into the shaft hole 5 at the center of the body 10, aligning the key groove 40 inside the body 10 with a key groove on the rotary shaft, and inserting a key into the key grooves, and is then fastened by fasteners (the parts [key groove, key, and fasteners] for fastening the beveling cutter on the pneumatic air or the electric tool 50 can vary as desired).

With the beveling cutter 100 fastened to the pneumatic air or electric tool as shown 50, as described above, when the beveling cutter 100 is brought in contact with the work piece 60 and then power switch 70 is turned on, a drive unit (electric or fluid operated motor not shown) operates and rotates the cutter blades 20 of the beveling cutter 100.

When the cutter blades 20 rotate, beveling on the work piece 60 starts.

Chips (not shown) that are produced by the beveling surfaces of the cutter blades 20 are discharged through the discharge grooves 30 in beveling work piece 60. Further, the cutter blades 20 are generally coated, so that the chips are easily discharged without damaging the surfaces of the cutter blades 20.

Since the cutter blades 20 have the honed portion 12 on a side of the radial primary blade 14, the cutter blades 20 can be prevented from breaking and the surface roughness of work piece 60 can be improved in beveling work piece 60. Further, small particles are sintered in the honed portion 12, so that beveling can be implemented by the cutter blades with very sharp lines even in high-speed rotation while the lifespan of the cutter blades 20 can be considerably increased and high-quality surfaces can be achieved.

Since the radial primary 14 has a radial primary relief angle (a) ranging from about 5 to about 15 degrees, the load generated in beveling can be reduced. Further, since the radial secondary relief angle (b) of the radial secondary blade 16 connected with the radial primary blade about 14 ranges from about 16 to about 30 degrees, a sufficient gap is ensured between work piece 60 and radial primary blade 14 in beveling and thus machining interference and chattering can be prevented.

The beveling cutter of the present invention is available for various types of beveling including paint edge, weld edge, architectural edge, saddle, countersink, interior edge, straight edges and on automated edge machines. The beveling cutter of the present invention is available for all types of metal work including on carbon and stainless steel, on aluminum, iron, on nonferrous and on most exotic.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A beveling cutter comprising
   a body with a shaft hole formed through a center thereof,
   a plurality of cutter blades arranged at predetermined distances on a circumferential surface of the body,
   discharge grooves formed longitudinally between the cutter blades to discharge chips produced in beveling, wherein the cutter blades each have a radial primary blade with a radial primary relief angle (a) ranging from about 5 to about 15 degrees and a radial secondary blade with a radial secondary relief angle (b) ranging from about 16 to about 30 degrees, and
   a beveling angle in a range from about 15 to about 60 degrees.

2. The beveling cutter of claim 1, wherein a width of the radial primary blade ranges from about 0.6 to about 0.7 mm and the width of the radial secondary blade ranges from about 1.9 to about 2.0 mm.

3. The beveling cutter of claim 1, wherein a round portion is formed at ends of the cutter blades and has a radius ranging from about 0.1 to about 3.0 mm.

4. The beveling cutter according to claim 1, wherein a rake angle portion is formed at an angle ranging from about 10 to about 20 degrees on the cutter blades.

5. The beveling cutter according to claim 1, wherein the cutter blades have a core taper angle ranging from about 20 to about 30 degrees.

6. The beveling cutter according to claim 1, wherein honed portions are formed by honing a side of the radial primary blades at an angle ranging from about 1 to about 45 degrees.

7. The beveling cutter of claim 6, wherein a width of the honed portions ranges from about 0.05 to about 0.2 mm.

8. The beveling cutter according to claim 1, wherein the cutter blades have a helix angle that ranges from about 5 to about 45 degrees.

9. The beveling cutter of claim 1, wherein a width of the radial primary blade ranges from about 0.6 to about 0.7 mm and the width of the radial secondary blade ranges from about 1.9 to about 2.0 mm.

10. The beveling cutter of claim 1, wherein a round portion is formed at ends of the cutter blades and has a radius ranging from about 0.1 to about 3.0 mm.

11. The beveling cutter according to claim 1, wherein a rake angle portion is formed at an angle ranging from about 10 to about 20 degrees on the cutter blades.

12. The beveling cutter according to claim 1, wherein the cutter blades have a core taper angle ranging from about 20 to about 30 degrees.

13. The beveling cutter according to claim 1, wherein honed portions are formed by honing a side of the radial primary blades at an angle ranging from about 1 to about 45 degrees.

14. The beveling cutter of claim 13, wherein a width of the honed portions ranges from about 0.05 to about 0.2 mm.

15. The beveling cutter according to claim 1, wherein the cutter blades have a helix angle that ranges from about 5 to about 45 degrees.

16. A beveling tool comprising
    a body with a shaft hole formed through a center of the body,
    a plurality of cutter blades arranged at predetermined distances on a circumferential surface of the body and having a helix angle in a range from about 1 to about 45 degrees,
    discharge grooves formed longitudinally between the cutter blades to discharge chips produced in beveling, and
    a beveling angle in a range from about 15 to about 60 degrees.

17. A beveling cutter comprising
    a body with a shaft hole formed through a center thereof,
    a plurality of cutter blades arranged at predetermined distances on a circumferential surface of the body,
    discharge grooves formed longitudinally between the cutter blades to discharge chips produced in beveling, wherein the cutter blades each have a radial primary blade with a radial primary relief angle (a) ranging from about 5 to about 15 degrees and a radial secondary blade with a radial secondary relief angle (b) ranging from about 16 to about 30 degrees, and
    a beveling angle in a range from about 37.5 to about 45 degrees.

* * * * *